United States Patent
Choe

Patent Number: 5,298,591
Date of Patent: Mar. 29, 1994

[54] NON-CRYSTALLINE WHOLLY AROMATIC POLYESTERS

[75] Inventor: Eui W. Choe, Randolph, N.J.

[73] Assignee: Hoechst Celanese Corp., Somerville, N.J.

[21] Appl. No.: 979,098

[22] Filed: Nov. 20, 1992

[51] Int. Cl.⁵ ............... C08G 63/00; C08G 63/02; C08G 63/18
[52] U.S. Cl. .................... 528/190; 528/176; 528/193; 528/194
[58] Field of Search ............ 528/176, 190, 193, 194

[56] References Cited

U.S. PATENT DOCUMENTS

| | | | |
|---|---|---|---|
| 3,637,595 | 1/1972 | Cottis et al. | 528/194 |
| 4,075,173 | 2/1978 | Maruyama et al. | |
| 4,189,549 | 2/1980 | Matsunaga et al. | 525/439 |
| 4,311,823 | 1/1982 | Imai et al. | 528/181 |
| 5,023,314 | 6/1991 | Gupta et al. | 528/190 |
| 5,109,101 | 4/1992 | Gupta et al. | 528/190 |

FOREIGN PATENT DOCUMENTS

61-157527 7/1986 Japan .................. 528/194

OTHER PUBLICATIONS

British Polymer Journal, 12, pp. 154–162, Dec., 1980, by J. W. Jackson, Jr.

*Primary Examiner*—John Kight, III
*Assistant Examiner*—T. Mosley
*Attorney, Agent, or Firm*—James L. McGinnis

[57] ABSTRACT

Aromatic polyesters containing monomer units derived from terephthalic acid, one or more aromatic diols, such as bisphenol A, and one or more aromatic hydroxyacids, such as 4-hydroxybenzoic acid or 6-hydroxy-2-naphthoic acid, are described. The aromatic hydroxyacid is incorporated in a quantity sufficient to yield a polymer which is non-crystalline and which has a low enough softening temperature that it can be readily synthesized in the melt with a useful molecular weight without the need for subsequent solid state polymerization. These aromatic polyesters are useful for making transparent articles with high temperature properties.

19 Claims, 1 Drawing Sheet

NON-CRYSTALLINE WHOLLY AROMATIC POLYESTERS

TECHNICAL FIELD

The present invention relates generally to non-crystalline wholly aromatic polyesters and to shaped transparent articles made therefrom.

BACKGROUND OF THE INVENTION

Polymers of 2,2-bis(4-hydroxyphenyl)propane (hereinafter referred to as "bisphenol A"), terephthalic acid and isophthalic acid are well known wholly aromatic polyesters, generally being referred to as polyarylates. Polyarylates are commercially available, and their high heat distortion temperatures and transparency make them useful as a substitute for lower melting transparent polymers (e.g., polycarbonates) in high temperature applications. Other transparent polymers that can be used at elevated temperatures are not commonly available.

Polyarylates that also include 4-hydroxybenzoic acid as a comonomer have been described in the literature. These reports suggest that these polymers may have higher heat distortion temperatures than polyarylates without 4-hydroxybenzoic acid, but are difficult to process. For example, U.S. Pat. No. 4,189,549 describes and claims blends of the copolymers of isophthalic and/or terephthalic acid, 4-hydroxybenzoic acid and bisphenol A with other polymers. The patent describes the unblended copolymer as a "transparent resin having a high heat distortion temperature and excellent mechanical and electrical properties," but states that the copolymer is "hard to process by a conventional processing machine because of the high flow-starting temperature." The '549 patent then reports that blending the copolymers with polycarbonates or aliphatic polyesters corrects the "defects" of both components of the blends, yielding a blend that is more readily processed than the unblended copolymer.

A process for synthesizing copolymers of isophthalic and/or terephthalic acid, 4-hydroxybenzoic acid and bisphenol A is disclosed in U.S. Pat. No. 4,075,173. This patent teaches that the copolymer can readily be made in high molecular weight by first synthesizing a low molecular weight pre-polymer using a melt condensation process and then raising the molecular weight by solid state polymerization. The patent uses a two-step method because bulk polymerization directly to a high molecular weight results in coloration and degradation, which are caused by the high temperatures that are needed to keep the polymer in a molten state as the polymerization proceeds. The patent particularly emphasizes that polymerization of the acetate esters of the phenols and the free acids has the "fatal drawbacks" of coloration and deterioration.

These two patents therefore teach that a copolymer of isophthalic and/or terephthalic acid, 4-hydroxybenzoic acid, and bisphenol A cannot be made in high molecular weight by a direct melt polymerization, especially by polymerization of the acetate esters of the phenols. These patents furthermore suggest that these copolymers cannot be readily processed in the melt using conventional techniques (e.g., injection molding).

There is also one report of a copolymer of terephthalic acid, bisphenol A and 4-hydroxybenzoic acid (J. W. Jackson, Jr., British Polymer Journal, 12, pp. 154–162, December, 1980). This publication reports that incorporation of bisphenol A and terephthalic acid at a 30 mole % level in poly(4-hydroxybenzoate) (i.e., terephthalic acid:bisphenol A:4-hydroxybenzoic acid = 30:30:70) eliminates the liquid crystallinity of poly(4-hydroxybenzoate). The publication does not comment on the ease or difficulty of processing the copolymer in the melt, since the publication is directed to liquid crystalline polymers.

Finally, polyarylates made from isophthalic acid and/or terephthalic acid, bisphenol A and about 5 to 10 mole % of 6-hydroxy-2-naphthoic acid have been reported in U.S. Pat. No. 5,023,314 and a related process patent (U.S. Pat. No. 5,109,101). These polymers preferably contain at least about 10% isophthalic acid (as a % of the two diacids). Polymers containing only terephthalic acid, bisphenol A and 6-hydroxy-2-naphthoic acid are not mentioned in the patent, nor is 4-hydroxybenzoic acid mentioned as a potential comonomer.

SUMMARY OF THE INVENTION

The present invention comprises a non-crystalline melt processable wholly aromatic polyester consisting essentially of the following three monomer repeat units. The first monomer repeat unit (I) has the general formula:

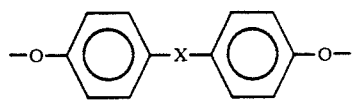

where X is a connecting group selected from O, S, $SO_2$, and $CRR'$, where R and R' are alike or different and can each be H, F, Cl, phenyl, and alkyl side chains having the formula $C_nH_xF_{2n+1-x}$, n being an integer from 1 to 6 and x being an integer from 0 to $2n+1$. Mixtures of monomer repeat units having the general formula I may also be used. Repeat unit II is terephthalate. Repeat unit III has the general formula:

where Ar is an aromatic moiety selected from 1,4-phenylene, 1,4-, 1,5-, 1,6-, 1,7-, 1,8-, 2,5-, 2,6-, and 2,7-naphthalenediyl, and mixtures thereof. Some or all of the aromatic residues of the monomer repeat units I, II, and III are optionally substituted with F, Cl and lower alkyl and fluoralkyl groups having 1 to 4 carbons. The number of monomer repeat units I and II are about equal, and the number of monomer repeat units III is selected so that the wholly aromatic polyester has a heat of fusion of about zero as measured by differential scanning calorimetry and a softening temperature range less than about 340° C. when measured by heating a polymer sample in a melting point capillary. It has been found that the polymer can be synthesized and processed in the melt when the softening temperature range is less than about 340° C. If monomer unit III is 6-oxy-2-naphthoate (i.e., Ar is 2,6-naphthalenediyl), it comprises greater than 12% of the total monomer repeat units I, II and III, preferably greater than 15% of I, II and III. Shaped transparent articles and films can be made by synthesizing the polymer described above and then shaping it into the desired article or film. These articles and films have excellent properties at elevated temperatures, as demonstrated by their high heat distortion temperatures and Vicat softening temperatures.

DETAILED DESCRIPTION OF THE INVENTION

Figure 1:
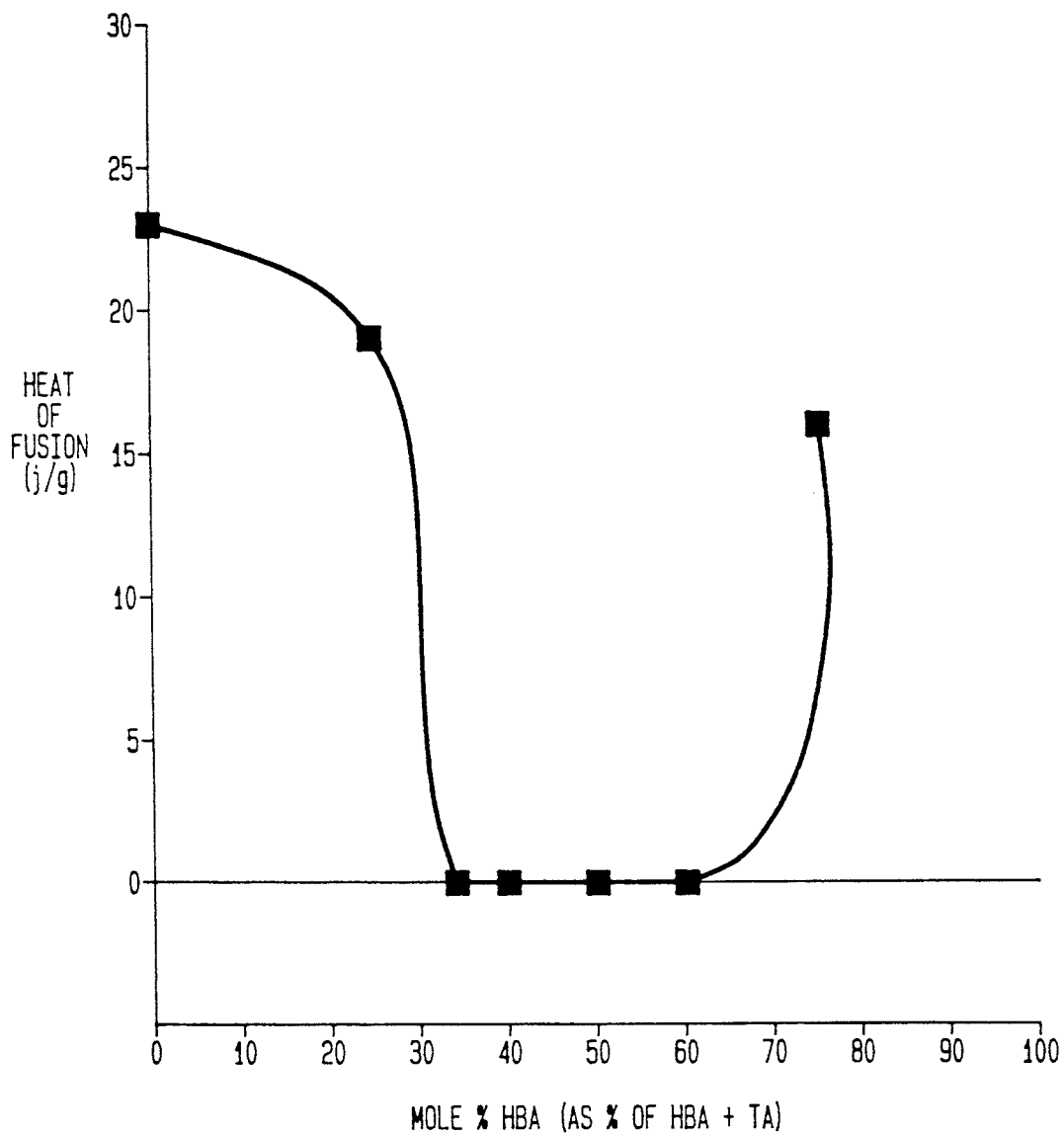
FIG. 1 is a graph of the heat of fusion of a copolymer of 4-hydroxybenzoic acid (HBA), terephthalic acid (TA) and bisphenol A as a function of the amount of HBA, measured as the mole % of HBA (% of the total number of moles of HBA and TA combined).

In preferred embodiments, monomer repeat unit I is derived from 2,2-bis(4-hydroxyphenyl)propane (bisphenol A), 2,2-bis(4-hydroxyphenyl)-1,1,1,3,3,3-hexafluoropropane, and mixtures thereof (i.e., X in structure I is $C(CH_3)_2$ or $C(CF_3)_2$). Preferred monomer repeat units III are those derived from 4-hydroxybenzoic acid, 6-hydroxy-2-naphthoic acid, and mixtures thereof (i.e., Ar in Structure III is 1,4-phenylene or 2,6-naphthalenediyl). A particularly preferred composition is the copolymer made from bisphenol A, terephthalic acid and 4-hydroxybenzoic acid.

It has been found that the properties of the copolymer can be altered so that the copolymer can be synthesized and processed in the melt by careful adjustment of the amount of monomer repeat unit III. If the softening temperature range of the copolymer as measured in a melting point capillary is less than about 340° C., the copolymer is sufficiently processable in the melt that it can be polymerized in the melt to a useful molecular weight without subsequent solid state polymerization (i.e., an inherent viscosity measured at 25° C. on a 0.1% solution on a weight-volume basis in a solvent consisting of equal parts by weight of hexafluoroisopropanol and pentafluorophenol of at least about 0.5 dl/g is achieved by melt polymerization). The inherent viscosity can be increased further by solid state polymerization if desired. It has also been found that by controlling the amount of monomer repeat unit III, a non-crystalline copolymer can be made; a non-crystalline copolymer is one that has a heat of fusion of about zero as measured by differential scanning calorimetry. Articles and films that are relatively transparent can therefore be made using the copolymers of the current invention.

For the preferred compositions made from bisphenol A, terephthalic acid and 4-hydroxybenzoic acid, a non-crystalline copolymer results when the amount of 4-hydroxybenzoic (HBA), either as a percent of the combined amounts of HBA and terephthalic acid (TA), or as a percent of the combined amounts of HBA and bisphenol A (bisA), is in the range of about 33% to about 60%. Compositions made from these three monomers have softening temperature ranges below about 340° C. when the amount of HBA present as monomer unit III is in the range of about 40% to about 60% of the combined amounts of HBA and TA, or of the combined amounts of HBA and bisA. This latter range of compositions can be synthesized to an inherent viscosity of at least about 0.5 dl/g in the melt without subsequent solid state polymerization.

A particularly preferred composition of HBA, TA and bisA results when approximately equimolar amounts of the three monomers are polymerized, so that the amount of HBA as a percent of the combined amounts of HBA and either TA or bisA is about 50%. This copolymer composition is approximately in the middle of the range of compositions that are non-crystalline and that have low enough softening temperature ranges to be synthesized in the melt. This copolymer has a softening temperature range as measured in a melting point capillary of about 290°-330° C. It is thus particularly suitable for making transparent, heat-resistant films and articles.

It has also been found that, when the aromatic hydroxyacid is 6-hydroxy-2-naphthoic acid, compositions containing greater than 5-10% of 6-hydroxy-2-naphthoic acid are melt processable. For example, a composition derived from terephthalic acid, bisphenol A and 6-hydroxy-2-naphthoic acid in a 3:3:1 mole ratio has a softening temperature range of about 280°-290° C. and is thus readily synthesized and processed in the melt. In this particular copolymer, the amount of monomer unit III derived from 6-hydroxy-2-naphthoic acid comprises about 14 mol % of the combined amounts of monomer units I, II and III.

The copolymers of the current invention can be synthesized by any of the methods that are commonly used for making aromatic polyesters. In general, the polymerization methods that are most successful involve the condensation of a reactive derivative of the acid groups (e.g. an acid chloride) or of the phenolic group (e.g. a phenolic acetate). These methods include: interfacial polymerization; processes in which the acid groups are first converted to esters of phenol prior to polymerization, with the phenol then being produced as a by-product during polymerization; and processes in which the hydroxyl groups of the aromatic hydroxyacid and aromatic diol are first acetylated, with polymerization then proceeding with production of by-product acetic acid. In the last of these methods, sometimes referred to as the "acetate method," the reacting aromatic hydroxy groups can also be acetylated in situ by using acetic anhydride as a reactant. All of these methods are well-known in the art. Variants of these processes using substituted phenols or higher aliphatic acids and anhydrides, such as propionic acid, are also known and can be used.

The preferred method for making the copolymers of 4-hydroxybenzoic acid, bisphenol A and terephthalic acid is by the acetate method, in which 4-acetoxybenzoic acid and bisphenol A diacetate react with terephthalic acid to produce the copolymer. From a commercial point of view, this is most practically done by combining the three monomers with enough acetic anhydride to generate the intermediate acetates in situ.

The reaction may be carried out in the melt or in a high boiling solvent. A solvent that is particularly useful for producing copolymers of 4-hydroxybenzoic acid, terephthalic acid and bisphenol A is a eutectic mixture of diphenyl ether and biphenyl, which has a boiling point of about 255° C. and is sold commercially as Dowtherm A. The amount of solvent can vary over a wide range, preferably comprising about 10% to about 60% by weight of the total charge, and more preferably about 30% to about 40% of the total charge. The polymerization is carried out under an inert atmosphere or under a vacuum. The by-product acetic acid and the solvent are removed by distillation as the polymerization proceeds. The temperature of the reaction is raised gradually or in steps, with the polymerization preferably being completed by heating the polymer in the melt phase with stirring in the temperature range of about 280° C.-310° C. for about one-half hour to about two hours under a vacuum.

Polymerization is continued until the polymer reaches the desired molecular weight. Generally an inherent viscosity (I.V.) of up to about 0.6 dl/g as determined at 25° C. on a 0.1% solution on a weight/volume basis in equal parts by weight of hexafluoroisopropanol and pentafluorophenol can be achieved by this procedure. This is a high enough molecular weight polymer for most uses. Higher I.V. polymer can be obtained by washing the copolymer with methanol and then drying it at 100° C. in an oven. Alternatively, the molecular weight can be raised by solid state polymerization at a temperature greater than about 200° C. but below the melting point under vacuum or under an inert atmosphere. A preferred temperature is about 240° C.

The polymerization reaction is preferably carried out in the presence of a catalyst which accelerates the rate. Any catalyst which accelerates the rate of ester interchange reactions is suitable. Alkali metal salts, such as lithium acetate dihydrate, are preferred. The presence of a cocatalyst is also beneficial, particularly cobalt salts, as for example cobalt acetate, and the like.

The resulting copolymer can be made into a shaped transparent article by any of the methods normally used for shaping thermoplastic polymers. Thus, for example, the copolymer can be subjected to injection molding, compression molding, extrusion, blow molding, foam molding or rotational molding. It can be coated onto a shaped article. The copolymer can be made into a film, e.g., by solution casting, calendaring, or melt extrusion through a die. The copolymer of this invention can be combined with various additives, such as anti-oxidants, plasticizers, pigments, lubricating agents, mold release agents, stabilizers, inorganic fillers and the like. Inorganic fillers that may be added include finely divided particulate and fibrous materials, as for example, silica, quartz, diatomaceous earth, metal oxides, metal carbonates, asbestos, glass fibers, carbon fibers, clay, mica, talc, graphite flake, wollastonite and the like. The copolymers can also be blended with other polymers.

The following examples are provided for the purpose of illustrating the invention and should not be construed so as to limit the invention to the specific embodiments shown.

EXAMPLE 1

In a 1-liter three-necked resin flask equipped with a nitrogen inlet and outlet, thermometer, condenser and mechanical stirrer were placed terephthalic acid (49.8 gms, 0.3 moles), bisphenol A (68.49 gms, 0.3 moles), p-hydroxybenzoic acid (41.44 gms, 0.3 moles), Dowtherm A (165 gms), acetic anhydride (91.88 gms, 0.9 moles), lithium acetate dihydrate (0.0429 gms) and cobalt acetate (0.0498 gms). The resulting mixture was heated at 140° C. for 30 minutes, 280° C. for 75 minutes and then under vacuum at 280° C. for 15 minutes, 300° C. for 15 minutes and finally at 310° C. for 60 minutes. Acetic acid and Dowtherm A were removed during the heating, both at atmospheric pressure and under vacuum. The copolymer was ground, washed with methanol and dried at 100° C. in an air oven to obtain 186.5 grams of transparent copolymer having the following properties: inherent viscosity (I.V.) 0.95 dl/g as determined at 25° C. on a 0.1% solution on a weight/volume basis in equal parts by volume of hexafluoroisopropanol and pentafluorophenol; $T_g$ 204 degrees; heat of fusion = 0 j/g; $T_d$ 510° C. (decomposition temperature, defined as the temperature at which 10% weight loss has occurred by thermal gravimetric analysis at a heating rate of 10° C./min). The above ground copolymer was solid state polymerized at 240° C. under a reduced pressure for 16 hours to attain copolymer with I.V. 1.12 dl/g.

EXAMPLE 2

In a 1-liter three-necked resin flask equipped with a nitrogen inlet and outlet, a thermometer, condenser and mechanical stirrer were placed terephthalic acid (49.8 gms, 0.3 moles), bisphenol A diacetate (93.6 gms, 0.3 moles), 4-acetoxybenzoic acid (54 gms, 0.3 moles), a eutectic solution of diphenyl ether and biphenyl (Dowtherm A, 165 gms), lithium acetate (0.0429 gms) and cobalt acetate (0.0498 gms). The resulting mixture was heated with stirring to 280° C. over a one hour period. The temperature was maintained at 280° C. for 1.25 hours. By-product acetic acid and Dowtherm A were collected by distillation during this time. Vacuum was applied and the temperature was raised to 310° C., where it was held for 20 minutes. After cooling, the solid product was ground, washed with methanol, and dried in an air oven at 100° C. to yield 186.5 gms of transparent polymer having the following properties: I.V. (measured at 25° C. using a 0.1% solution on a weight/volume basis in a solution of equal parts by volume of hexafluoroisopropanol and pentafluorophenol), 0.92 dl/g; $T_g$, 204° C.; heat of fusion, 0.

The polymer was ground and was then heated at 240° C. under a reduced pressure, resulting in a polymer with I.V. 1.23 and $T_g$ 216° C. This example and the previous example illustrate that the polymer can be made in a high molecular weight by the reaction of the aromatic acid groups with aliphatic esters of the aromatic hydroxyl groups; the aliphatic esters can be generated in situ by combining the aromatic diol and aromatic hydroxyacid with an acylating agent, such as an aliphatic acid halide or anhydride. The molecular weight can be raised even higher by solid state polymerization if a very high molecular weight polymer is needed.

EXAMPLE 3

A series of polymers of 4-hydroxybenzoic acid, terephthalic acid and bisphenol A was made using essentially the methods described in Examples 1 and 2. These copolymers were made with varying amounts of 4-hydroxybenzoic acid, and their thermal properties were measured. A softening temperature range was measured for each polymer by placing a sample in a melting point capillary and heating it in a melting point apparatus. The term "softening temperature" is defined as the range from the temperature at which the polymer appears to start melting to the temperature at which it appears to be fully molten. The glass transition temperature, melting point and heat of fusion were measured by differential scanning calorimetry. Those samples that showed crystalline melting points were cooled from the melt to room temperature at a rate of 10° C./min, and a second scan was carried out to determine whether the samples crystallized on cooling. These data are presented in Table 1 as a function of the amount of 4-hydroxybenzoic acid, measured as a mole % of the combined amounts of 4-hydroxybenzoic acid and terephthalic acid. The heat of fusion is plotted in FIG. 1 as a function of the mole % of 4-hydroxybenzoic acid.

It is apparent from the data in Table 1 and the plot in FIG. 1 that the copolymers are non-crystalline over at least the range from about 33% to about 60% 4-hydroxybenzoic acid. Furthermore, samples with 25% and 75% 4-hydroxybenzoic acid were non-crystalline after cooling from the melt. The softening temperature also varied with the amount of 4-hydroxybenzoic acid. Empirically, it has been observed that the polyesters are readily processed in the melt when the upper limit of the softening temperature range is not higher than about 340° C. Using this criterion, the range of compositions that are melt processable are between about 40% 4-hydroxybenzoic acid at the low end to about 60% 4-hydroxybenzoic acid at the upper end of the composition range. It is also apparent in the data for the composition containing 50 mole % 4-hydroxybenzoic acid that the glass transition temperature of the polymer depends on the molecular weight, as indicated by inherent viscosity (see also Example 6). The softening temperature by comparison is independent of molecular weight.

TABLE 1

Thermal Properties of HBA/TA/BisA Polymers[1]

| Mole %[2] HBA | T.S.[3] (°C.) | I.V.[4] (dl/g) | $T_g$[5] (°C.) | $\Delta H_f$[5] (J/g) | $T_m$[5] (°C.) |
|---|---|---|---|---|---|
| 0 | 360°–365° | — | 220° | 23 | 355° |
| 25 | — | 0.41 | 184° | 19 | 238°[6] |
| 33 | 350°–380° | — | 206°–221° | 0 | — |
| 40 | 305°–330° | 0.62 | 191° | 0 | — |
| 50 | 290°–330° | 0.76[7] | 204°[7] | 0 | — |
| 60 | 310°–340° | 0.62 | 173° | 0 | — |
| 75 | 345°–375° | 0.73 | 211° | 16 | 363°[6] |

[1]HBA = 4-hydroxybenzoic acid, TA = terephthalic acid, BisA = bisphenol A.
[2]Mole % of HBA + TA.
[3]Softening temperature, measured by heating in a melting point capillary.
[4]Inherent viscosity, measured at 25° C. as a 0.1% solution on a weight-volume basis in a solution of equal parts by volume of hexafluoroisopropanol and pentafluorophenol.
[5]Glass transition temperature ($T_g$), heat of fusion ($\Delta H_f$) and melting point ($T_m$), all measured by differential scanning calorimetry.
[6]No heat of fusion on second heating after cooling from the melt.
[7]A sample having the same composition but an I.V. of 1.34 exhibited a $T_g$ of 224°.

EXAMPLE 4

Five batches of the copolymer having a composition of 4-hydroxybenzoic acid, terephthalic acid and bisphenol A in about equimolar amounts were made on a larger scale in a 5 gallon polymerization reactor. The agitator had a torque of 850 in-lbs at 5 rpm. Polymer batches were made on a scale of 1.99 kg to 2.98 kg. Conditions were similar to those of Example 1, except that different heating programs were used for each batch, with the following range of conditions: 140° for 30 min, 140°–280° for 135–270 min, 280° to a final temperature of 300°–330° for 30–110 min, followed by vacuum at the final temperature for 10–67 min. Despite the wide variation in heating programs, the inherent viscosity of the final product ranged from 0.49 to 0.60 dl/gm when measured by the method used in Examples 1 and 2. Colors varied from clear to hazy to opaque (1 batch) or yellow (1 batch). Higher inherent viscosities ranging from 0.72 to 1.80 dl/gm, were achieved by solid state polymerization of powdered polymer at 240° for 16 hours.

EXAMPLE 5

Three batches of the copolymer having a composition of 4-hydroxybenzoic acid, terephthalic acid and bisphenol A in about equimolar amounts were made in a 50-gallon reactor using the same general procedure as was used in Example 1. The quantity of product ranged from 36 to 64 pounds. The heating programs differed from batch to batch as follows: 140° for 30 min, 140°–280° for 255–300 min, 280° to a final temperature of 290°–310° for 30–70 min, followed by vacuum at the final temperature for 10–30 min. The inherent viscosities of the three batches of polymer varied from 0.49–0.56 dl/gm.

EXAMPLE 6

Several batches of copolymer having a composition of 4-hydroxybenzoic acid, terephthalic acid and bisphenol A in about equimolar amounts were made by the methods of Examples 1 and 2 to achieve samples having a broad range of inherent viscosities. The glass transition temperatures were measured as a function of I.V., and were found to increase with molecular weight (I.V.) as follows: I.V. 0.49 dl/gm, $T_g$ 178° C.; 0.63, 210°–214°; 0.66, 206°–220°; 0.76, 204°; 0.92, 206°; 1.06, 209°; 1.23, 216°; 1.34, 224°; 1.35, 218°; 1.54, 241°; 2.00, 238°; 2.50, 241°; 2.51, 255°. None of the samples had crystalline melting points. For comparison, the $T_g$'s of commercial polyarylate samples were measured. These samples, which had I.V.'s of 0.58 and 0.66 dl/gm when measured at 30° C. as a 0.5% solution (weight/volume) in 1,1,2,2-tetrachloroethane, had $T_g$'s of 184° and 193° respectively.

Other thermal properties were also measured for the sample having an I.V. of 1.06 dl/gm. The Vicat softening temperature, measured by ASTM method D-1525, was 236° C., compared with values of 193° and 204° for commercial samples of polyarylate made from bisphenol A, terephthalic acid and isophthalic acid. The heat distortion temperature at 264 psi, measured by ASTM method D-648, was 195° C., compared with values of 158° and 170° measured on samples of commercial polyarylate made from bisphenol A, terephthalic acid and isophthalic acid.

It is apparent that the thermal properties (i.e. heat distortion temperature and Vicat softening temperature) are significantly higher for the copolymer of the current invention in comparison with commercial polyarylates.

EXAMPLE 7

Films were prepared by three different methods using different batches of the copolymer containing approximately equimolar amounts of 4-hydroxybenzoic acid, terephthalic acid and bisphenol A. The methods for preparing the films are described below.

(1) Solution Casting. Methylene chloride solutions of the 1/1/1 copolymer were prepared at 10% concentration and were cast onto glass plates at a thickness of 30 to 50 mil, depending on the desired thickness of the films. The solvent was allowed to evaporate in a controlled environment by covering the plates with a tray. The films were separated from the glass plates by soaking in water. It was found that the minimum inherent viscosity needed for obtaining a continuous free film was about 0.50 dl/gm.

(2) Calendaring. Powdered copolymer having an I.V. of 0.92 dl/g was pressed at 340° C. on a hot plate, and the resulting sheet was then calendared at 320° C. to obtain a thinner film, having a thickness of about 3 mils.

(3) Melt Extrusion. Samples of copolymer having I.V.'s of 0.74 dl/g and 0.81 dl/g were melt extruded through various slot dies at about 340°–350° C. to yield films of varying thickness.

The film samples, varying in thickness from 1.5–6 mils, exhibited the following range of tensile properties, depending on how the samples were made; tensile strength, 8.6–10.8 Kpsi (machine direction); 9.1–10.3 Kpsi (transverse direction); tensile modulus, 0.2–0.27

Msi (machine direction); 0.21–0.28 Msi (transverse direction); elongation, 10–24% (machine direction), 10–25% (transverse direction). The films had tear strengths ranging from about 1 to 5 g/mil in both the machine direction and the transverse direction. According to thermal mechanical analysis (TMA), the films possessed a % extension under load at 190° C. ranging from 1.96% to 3.94% in the machine direction and 1.99% to 2.19% in the transverse direction. The films were transparent, showing 88.6%–90.5% light transmission and 1.84%–3.44% haze. Measurement of electrical properties of the films resulted in a dielectric strength of 2547 to 5647 V/mil and a dielectric constant of 3.19. The films exhibited excellent barrier properties, having a WVTR ranging from 6.19 to 7.94 g-mil/100 sq in-day-atm and an oxygen permeability of 93–97 cc-mil/100 sq in-day-atm.

EXAMPLE 8

A sample of copolymer containing equimolar amounts of the three comonomers and having an I.V. of 0.81 dl/g was injection molded on an Arburg molding machine. The molding temperature profile for the four heated zones was 364°/383°/383°/386° C., the nozzle temperature being 386° C., and the pressure was 20.5 Kpsi. Test bars were made for physical testing. The following properties were determined: tensile strength, 9.7 Ksi; tensile modulus, 0.307 Msi; elongation, 9%; flexural strength, 13.0 Ksi; flexural modulus, 0.377 Msi; notched Izod, 2.8 ft-lb.

EXAMPLE 9

Several other copolymers were made using 6-hydroxy-2-naphthoic acid and 2,2-bis(4-hydroxyphenyl)-1,1,1,3,3,3-hexafluoropropane as comonomers. These were made by melt polymerization according to the methods of Examples 1 and 2. These copolymers all had softening temperatures below about 290° C., and all were non-crystalline as determined by differential scanning calormetry. The results are summarized in Table 2.

TABLE 2

| Thermal Properties of Amorphous Transparent Polyarylates | | | | | | |
|---|---|---|---|---|---|---|
| Composition[1] | Mole Ratio | T.S.[2] (°C.) | I.V.[3] (dl/g) | $T_g$[1] (°C.) | $\Delta H_f$[4] (j/g) | $T_m$[4] (°C.) |
| TA/BisA/HNA | 3/3/1 | 280°–290° | 0.55 | 201° | 0 | — |
| TA/BisAF/HNA | 3/3/1 | 260°–280° | 0.40 | 205° | 0 | — |
| TA/BisA/HBA/HNA | 6/6/3/1 | 250°–280° | 0.67 | 186° | 0 | — |

[1]TA = terephthalic acid, BisAF = 2,2-bis (4-hydroxyphenyl)-1,1,1,3,3,3-hexafluoropropane, HBA = 4-hydroxybenzoic acid, BisA = bisphenol A, HNA = 6-hydroxy-2-naphthoic acid.
[2]Softening temperature, measured by heating in a melting point capillary.
[3]Inherent viscosity, measured at 25° C. as a 0.1% solution on a weight-volume basis in a solution of equal parts by volume of hexafluoroisoropanol and pentafluorphenol.
[4]Glass transition temperature ($T_g$), heat of fusion ($\Delta H_f$) and melting point ($T_m$) measured by differential scanning calorimetry.

What is claimed is:

1. A non-crystalline melt-processable wholly aromatic polyester consisting essentially of monomer repeat units I, II, and III, where I is

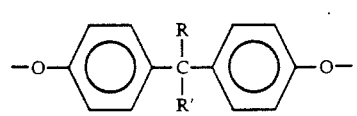

II is

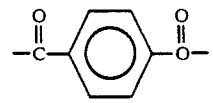

and

III is

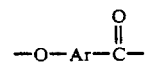

where R and R' are alike or different and are each selected from the group consisting of H, F, Cl, phenyl, alkyl side chains having the formula $C_nH_xF_{2n+1-x}$, n being an integer from 1 to 6 and x being an integer from 0 to $2n+1$;

wherein Ar is an aromatic moiety selected from the group consisting of 1,4-phenylene, 1,4-, 1,5-, 1,6-, 1,7-, 1,8-, 2,5-, 2,6- and 2,7-naphthalenediyl, and mixtures thereof;

wherein some or all of said monomer repeat units I, II and III are optionally substituted on the aromatic ring with F, Cl and lower alkyl and fluoralkyl groups having 1–4 carbons;

wherein the number of said monomer repeat units I and II is about equal;

wherein the number of said monomer repeat units III is selected so that the wholly aromatic polyester has a heat of fusion of about zero as measured by differential scanning calorimetry and a softening temperature range less than about 340° C. when measured by heating in a melting point capillary, except that if Ar is 2,6-naphthalenediyl, the number of said monomer repeat units III comprises greater than 12% of the total number of said monomer repeat units I, II and III;

and wherein said monomer unit III comprises about 40% to about 60% of the total of said monomer repeat units I and III when R and R' are each methyl and Ar is 1,4-phenylene.

2. The non-crystalline melt-processable wholly aromatic polyester as recited in claim 1, wherein the inherent viscosity of said composition is at least about 0.5 dl/g when measured at 25° C. and 0.1% concentration on a weight-volume basis in a solution of equal parts by volume of hexafluoroisopropanol and pentafluorophenol.

3. A shaped article comprising the non-crystalline melt-processable wholly aromatic polyester recited in claim 2.

4. The non-crystalline melt processable wholly aromatic polyester as recited in claim 1, wherein said monomer repeat unit I is

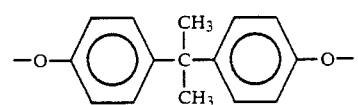

and said monomer repeat unit III is a mixture of

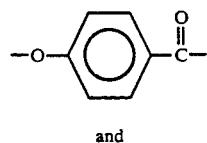

and

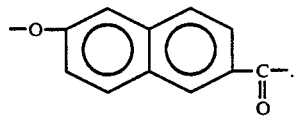

5. The non-crystalline melt processable wholly aromatic polyester as recited in claim 1, wherein said monomer repeat unit I is

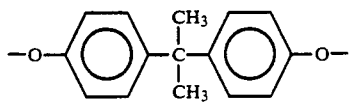

and said monomer repeat unit III is

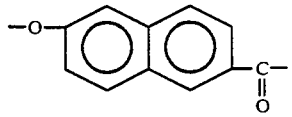

said monomer repeat unit III comprising greater than 15% of the total number of said monomer repeat units I, II and III.

6. The non-crystalline melt processable wholly aromatic polyester as recited in claim 1, wherein said monomer repeat unit I is

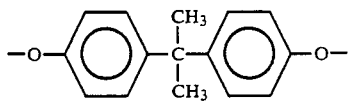

and said monomer repeat unit III is

said monomer repeat unit III comprising about 40% to about 60% of the total of said monomer repeat units I and III.

7. The non-crystalline melt-processable wholly aromatic polyester as recited in claim 6, wherein said monomer repeat unit III comprises about 50 mol.% of the total of said monomer repeat units I and III.

8. The non-crystalline melt-processable wholly aromatic polyester as recited in claim 1, wherein said monomer repeat unit I is

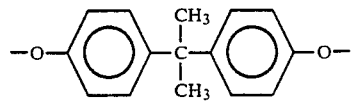

and III is selected from

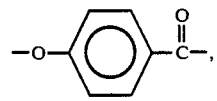

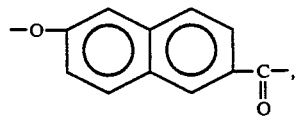

and mixtures thereof.

9. A method for synthesizing a non-crystalline melt-processable wholly aromatic polyester comprising the condensation of one or more aromatic diols or reactive derivatives thereof, terephthalic acid or a reactive derivative thereof, and one or more aromatic hydroxyacids or reactive derivatives thereof, to yield a polymer consisting essentially of monomer repeat units I, II, and III, where I is

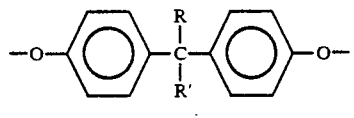

II is

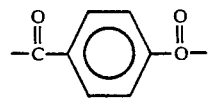

and III is

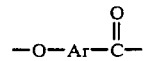

where R and R' are alike or different and are each selected from the group consisting of H, F, Cl, phenyl, alkyl side chains having the formula $C_nH_xF_{2n+1-x}$, n being an integer from 1 to 6 and x being an integer from 0 to $2n+1$;

wherein Ar is an aromatic moiety selected from the group consisting of 1,4-phenylene, 1,4-, 1,5-, 1,6-, 1,7-, 1,8-, 2,5-, 2,6- and 2,7-naphthalenediyl, and mixtures thereof;

wherein some or all of said monomer repeat units I, II and III are optionally substituted on the aromatic ring with F, Cl and lower alkyl and fluoralkyl groups having 1–4 carbons;

wherein the number of said monomer repeat units I and II is about equal;

wherein the number of said monomer repeat units III is selected so that the wholly aromatic polyester has a heat of fusion of about zero as measured by differential scanning calorimetry and a softening temperature range less than about 340° C. when measured by heating in a melting point capillary, except that if Ar is 2,6-naphthalenediyl, the number of said monomer repeat units III comprises greater than 12% of the total number of said monomer repeat units I, II and III;

wherein said monomer unit III comprises about 40% to about 60% of the total of said monomer repeat units I and III when R and R' are each methyl and Ar' is 1,4-phenylene; and wherein said aromatic polyester has an intrinsic viscosity of at least about 0.5 dl/g when measured at 25° C. and 0.1% concentration on a weight-volume basis in a solution of equal parts by volume of hexafluoroisopropanol and pentafluorophenol.

10. The method for making a non-crystalline wholly aromatic polyester as recited in claim 9, where said monomer repeat unit I is

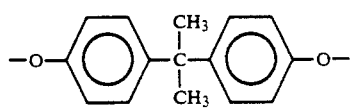

and said monomer repeat unit III is a mixture of

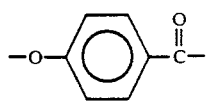

and

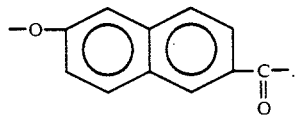

11. The method for making a non-crystalline wholly aromatic polyester as recited in claim 9, wherein said monomer repeat unit I is

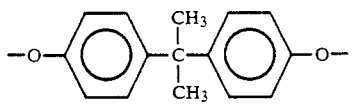

and said monomer repeat unit III is

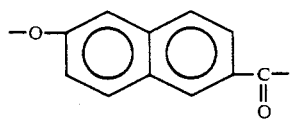

said monomer repeat unit III comprising greater than 15% of the total number of monomer repeat units I, II and III.

12. The method for making a non-crystalline wholly aromatic polyester as recited in claim 9, wherein said non-crystalline melt-processable wholly aromatic polyester consists essentially of said monomer repeat units I, II and III, where said monomer repeat unit I is

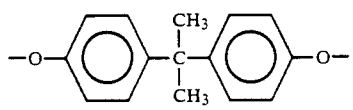

and said monomer repeat unit III is

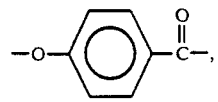

said monomer repeat unit III comprising about 40% to about 60% of the total of said monomer repeat units I and III.

13. The method for making a non-crystalline wholly aromatic polyester as recited in claim 12, wherein said monomer repeat unit III comprises about 50% of the total of said monomer repeat units I and III.

14. The method for making a non-crystalline wholly aromatic polyester as recited in claim 9, where said monomer repeat unit I is

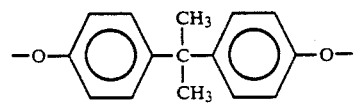

and said monomer repeat unit III is selected from the group consisting of

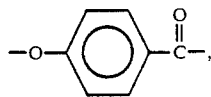

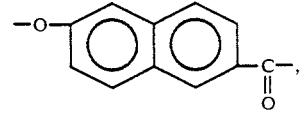

15. The method for making a non-crystalline wholly aromatic polyester as recited in claim 9, wherein said condensation is carried out by the reaction of terephthalic acid with aliphatic esters of said aromatic diols and of said aromatic hydroxyacids.

16. A method for making a shaped transparent article or film comprising the steps of synthesizing a non-crystalline melt-processable wholly aromatic polyester as recited in claim 9 and shaping the wholly aromatic polyester to yield the shaped transparent article or film.

17. The method for making a shaped transparent article or film as recited in claim 16, wherein said shaping step comprises a method selected from the group consisting of injection molding, compression molding, extrusion, blow molding, foam molding, rotational molding, coating onto a second shaped article, solution casting, calendaring, melt extrusion through a die, and combinations thereof.

18. A method for making a non-crystalline melt-processable wholly aromatic polyester, comprising the steps of:

(a) making a mixture comprising 1 part on a molar basis of bisphenol A, bisphenol A monoacetate, bisphenol A diacetate, or a mixture thereof; about 1 part on a molar basis of terephthalic acid; about 0.67 to about 1.5 parts on a molar basis of 4-hydroxybenzoic acid, 4-acetoxybenzoic acid, or a mixture thereof; and acetic anhydride in at least the quantity needed to react with all of the remaining hydroxyl groups of said bisphenol A, said bisphenol A monoacetate and said 4-hydroxybenzoic acid; and (b) heating said mixture while removing by-product acetic acid by distillation or evaporation at a temperature and for a time sufficient to yield a molten polyester having an intrinsic viscosity of at least about 0.5 dl/g.

19. The method as recited in claim 18, wherein said mixture further comprises a solvent having a boiling point less than about 300° C., said solvent being removed by distillation or evaporation while heating said mixture as recited in said step (b).

* * * * *